United States Patent [19]
Feuer et al.

[11] Patent Number: 5,453,011
[45] Date of Patent: Sep. 26, 1995

[54] FLIGHT SIMULATOR

[76] Inventors: Eduard Feuer, 1551 Raymond Ave., Glendale, Calif. 91201; Ronald L. Brown, 9373 Avalon Rd., Phelan, Calif. 92371

[21] Appl. No.: 75,695

[22] Filed: Jun. 10, 1993

[51] Int. Cl.⁶ ..................................................... G09B 9/12
[52] U.S. Cl. .................. 434/38; 434/55; 434/30
[58] Field of Search .................. 424/29, 30, 38, 424/43, 51, 55, 58

[56] References Cited

U.S. PATENT DOCUMENTS 1,934,464  11/1933  Helper .
3,281,962  11/1966  Pancoe ........................................ 434/58
3,496,650  2/1970  Kimball et al. ........................... 434/55
3,584,429  6/1971  Wadlow ...................................... 434/55
4,019,261  4/1977  Pancoe ........................................ 434/58
4,710,128  12/1987  Wachsmuth et al. ..................... 434/46
4,751,662  6/1988  Crosbie .................................. 434/55 X

*Primary Examiner*—Gene Mancene
*Assistant Examiner*—Jeffrey A. Smith
*Attorney, Agent, or Firm*—Christie, Parker & Hale

[57] ABSTRACT

A flight simulator for amusement rides simulating aircraft or space flight with visual presentations and motion having an operator station attached to a structural support frame through an articulating member providing unlimited angular rotation about a roll axis and limited angular rotation about a pitch axis.

7 Claims, 3 Drawing Sheets

FLIGHT SIMULATOR

BACKGROUND OF THE INVENTION

1. Field of the Invention

The present invention relates generally to the field of amusement rides which simulate aircraft or space flight with visual presentations and motion. In particular the flight simulator provides for independent control of rotation about a pitch axis and roll axis including the capability for complete inversion of an occupant station simulating a cockpit.

2. Prior Art

Motion simulators for training and amusement are well known in the art. Aircraft simulators for use by the military and airlines incorporate highly sophisticated hydraulic drive systems often offering up to six axes of motion for relatively short dimensional excursions. Amusement rides offering motion simulation for automobiles, space flight, aircraft and other fantasy travel have typically employed technology very similar to the high fidelity training simulators while somewhat reducing complexity and cost. A typical system employs a platform having an occupant station which incorporates a means for visual simulation through motion picture or computer-generated scenery imaging. The occupant platform is mounted on or suspended from multiple hydraulic actuators which impart motion to the platform. The number and mounting location of the actuators is determined in engineering tradeoffs for size of the actuators and the equations of motion to be used for the simulation. Three actuator systems and six actuator systems are common with mounting in a triangular pattern on the motion platform.

The cost and complexity of such hydraulic systems can be excessive for many applications, particularly in the amusement field where a reduction in fidelity is allowable, however full range of motion is still desired. In addition hydraulically operated systems such as those described cannot provide a complete inversion of the occupant station. Inversion of the occupant station may in certain cases reduce the fidelity of the motion simulation, however, particularly in the field of amusement rides a greater range of motion to provide excitement for a ride, even though strict equations of motion for a space craft or aircraft being simulated are not followed, may be preferable.

The present invention provides a low-cost mechanically-robust system for motion control of an operator station in a simulator applicable to either the training or amusement roll. In addition the present invention allows for complete inversion and 360 degree rotation in a roll axis for the operator station.

SUMMARY OF THE INVENTION

The flight simulator of the present invention incorporates an operator station having seating and operating controls for an occupant. A visual simulation is incorporated within the operator station.

The operator station is attached to a structural support frame through an articulating member providing limited angular rotation about a first axis and unlimited angular rotation about a second axis. The articulating member incorporates a rotating head pivotally mounted to a support case. An axle running through the support case and attached to the rotating head through a universal joint enables unlimited rotation of the head. A linear actuator attached through a lever arm provides leverage for pivotal motion of the rotating head about a transverse axis.

Power is supplied to the axle for rotation of the head by a first motor and gear reduction system while the linear actuator is operated by a second motor and reduction system. Each motor is controlled through a servo power amplifier which is in turn driven by a two axis motion controller.

Inputs from the controls in the operator station are provided to a control computer which provides commands to the two axis motion controller for creating motion in the linear actuator and rotating head derived from control equations in response to the motion of the operator controls.

BRIEF DESCRIPTION OF THE DRAWINGS

Details of the present invention will be more clearly understood with reference to the following drawings.

DETAILED DESCRIPTION OF THE INVENTION

Figure 1:
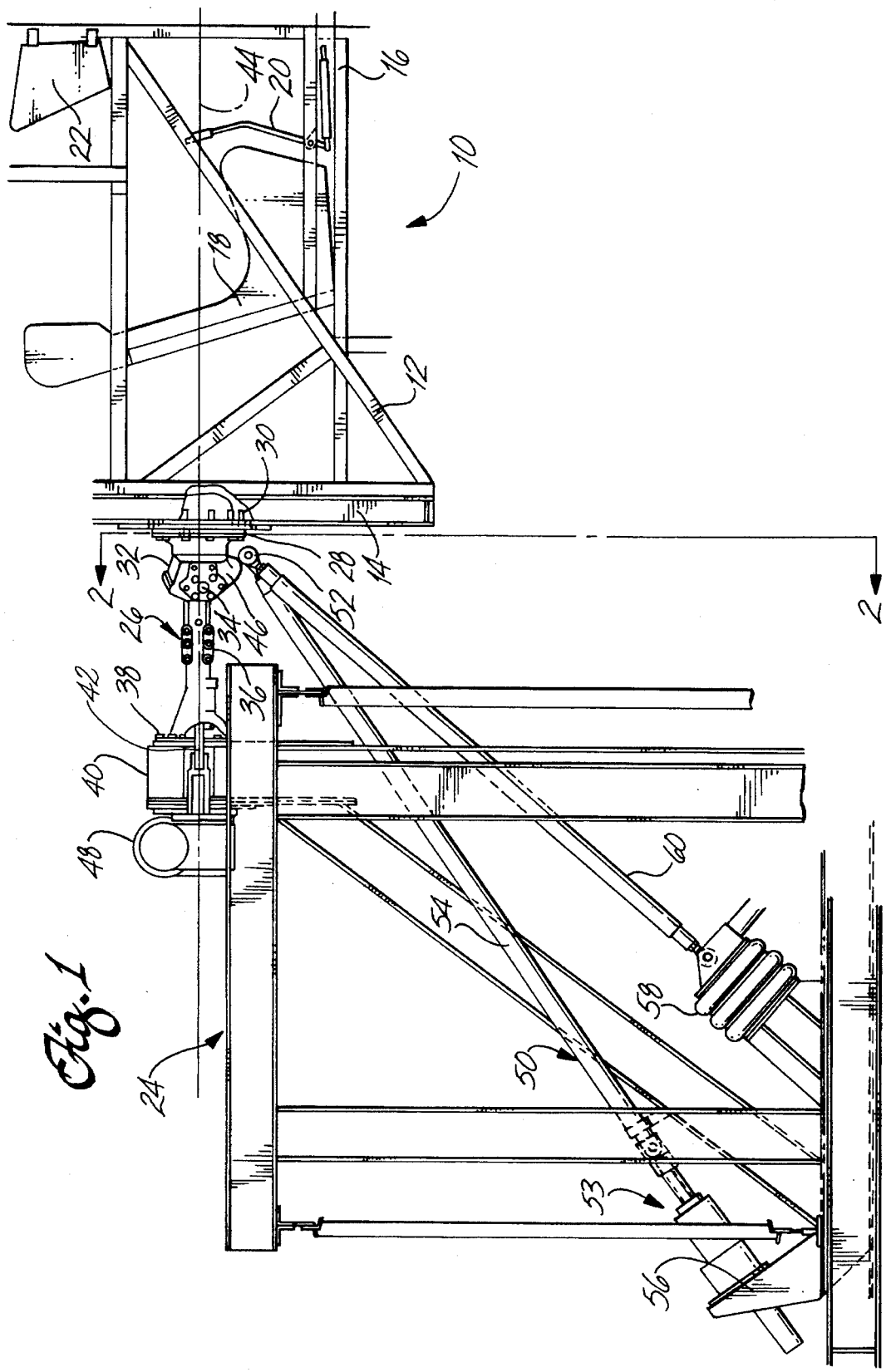
FIG. 1 is a side view of the structural and mechanical arrangement of a first embodiment of the invention.
Figure 2:
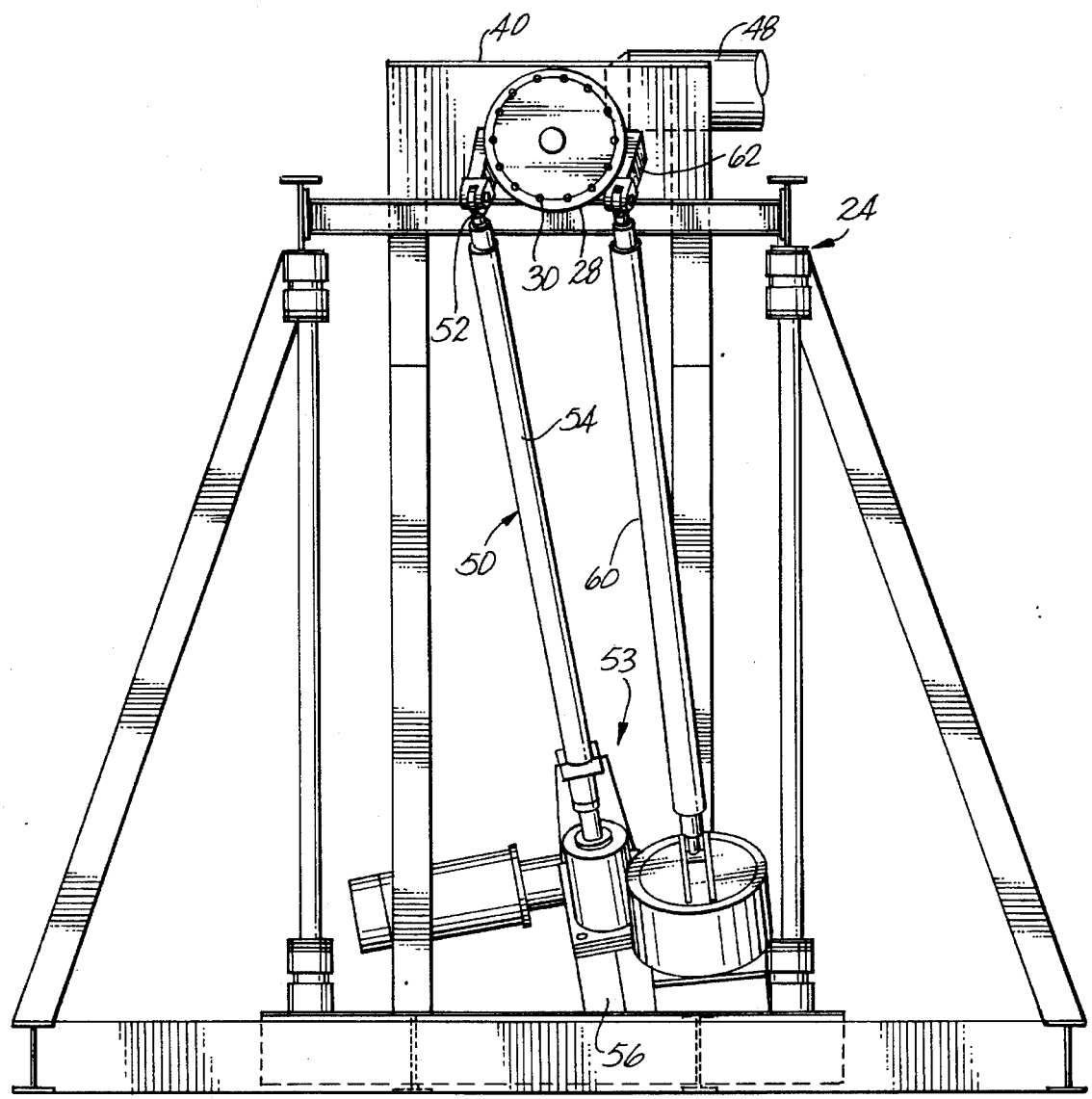
FIG. 2 is a front sectional view taken along line 2—2 of FIG. 1.

Referring to the drawings FIG. 1 discloses a first embodiment of the invention for a single seat motion simulator. The operator station or seat capsule 10 incorporates a structural cage 12 mounted to a back plane 14. A capsule floor 16 is mounted in the cage to support a seat 18 and operator controls in the form of an aircraft type stick 20. A visual display 22 is mounted in the cage relative to the seat to simulate the view through an aircraft wind screen. A suitable covering not shown for the capsule is employed to exclude extraneous light and other visual input which would be detrimental to the simulation. Those skilled in the art will recognize that additional video displays may be employed to simulate views out the side of an aircraft cockpit to enhance the realism of the simulation.

The seat capsule is mounted to a structural support frame 24 which in the embodiment shown comprises steel I-beams welded and/or bolted together to provide proper positioning and clearance for the seat capsule from the floor or other obstructions while providing sufficient support and stability for the overall simulator while the seat capsule is in motion. An articulating member 26 provides physical attachment of the seat capsule to the structural frame.

The articulating member constitutes a rotating head 28 which incorporates a plurality of mounting studs 30 to which the back plane of the seat capsule is attached. The rotating head is attached through a ring bearing to a casing 32 which is in turn pivotally mounted on stub axles 34 to a support pylon 36. The support pylon is attached at a flange end by a plurality of bolts 38 to a cross head 40 of the support structure.

Actuation of the rotating head is accomplished through an axle 42 which extends through the hollow support pylon to a universal joint not shown. In the casing the U-joint is in turn connected to the rotating head. Rotation of the axle and rotating head imparts rotational motion to the seat capsule about a roll axis 14.

Pivotal motion of the casing imparts motion to the seat capsule about a pitch axis defined by the stub axles. A lever arm 46 attached to the casing provides mechanical advantage for pivoting the casing.

In the embodiment shown in the drawings the articulating member comprises a heavy duty truck trans axle manufactured by Deere & Company, Moline, Illinois, identified as the 1100 series. This trans axle provides the rotating components necessary for the articulating member with the necessary universal joint on the drive axle and appropriate casting attachments. The lever arm 46 employs the existing steering link bar attachment for the trans axle.

Operation of the articulating member allows complete 360 degree rotation of the seat capsule about the roll axis and in the embodiment shown approximately ±55 degrees of rotation in the pitch axis for a total capsule excursion of 110 degrees in the pitch plane. This is accomplished with a simple mechanical structure requiring only two power sources, one for rotation of the axle and a second for pivoting of the casing.

Power for driving the axle to the rotating head in the embodiment shown in the drawings is provided through a gear reduction unit 48 driven by an electric motor. For the embodiment shown a Falk reducer designated unit size 525 is employed. An electric motor (not shown) drives the Falk reducer. Pivoting of the casing is accomplished through a linear actuator 50 attached to the lever arm through bearing 52. The linear actuator incorporates a ball screw jack 53 for extension and retraction of a drive rod 54. The screw jack is attached to the structural support through a mounting foot 56. In the embodiment shown in the drawings the ball and screw actuator employed is a screw jacs model 20HL BSJ.

Load balancing for the ball screw pitch actuator is provided through an air actuator 58 attached through rod extension 60 to a second lever arm 62 on the casing. A compression tank not shown connected to the air actuator acts as a pressure reservoir receiving gas from the actuator during compression and providing gas to the actuator during expansion in response to motion by the ball screw actuator. A significant portion of the load of the seat capsule in the pitch axis is born by the air actuator relieving the torque requirements on the ball screw actuator for obtaining pitch motion.

Figure 3:
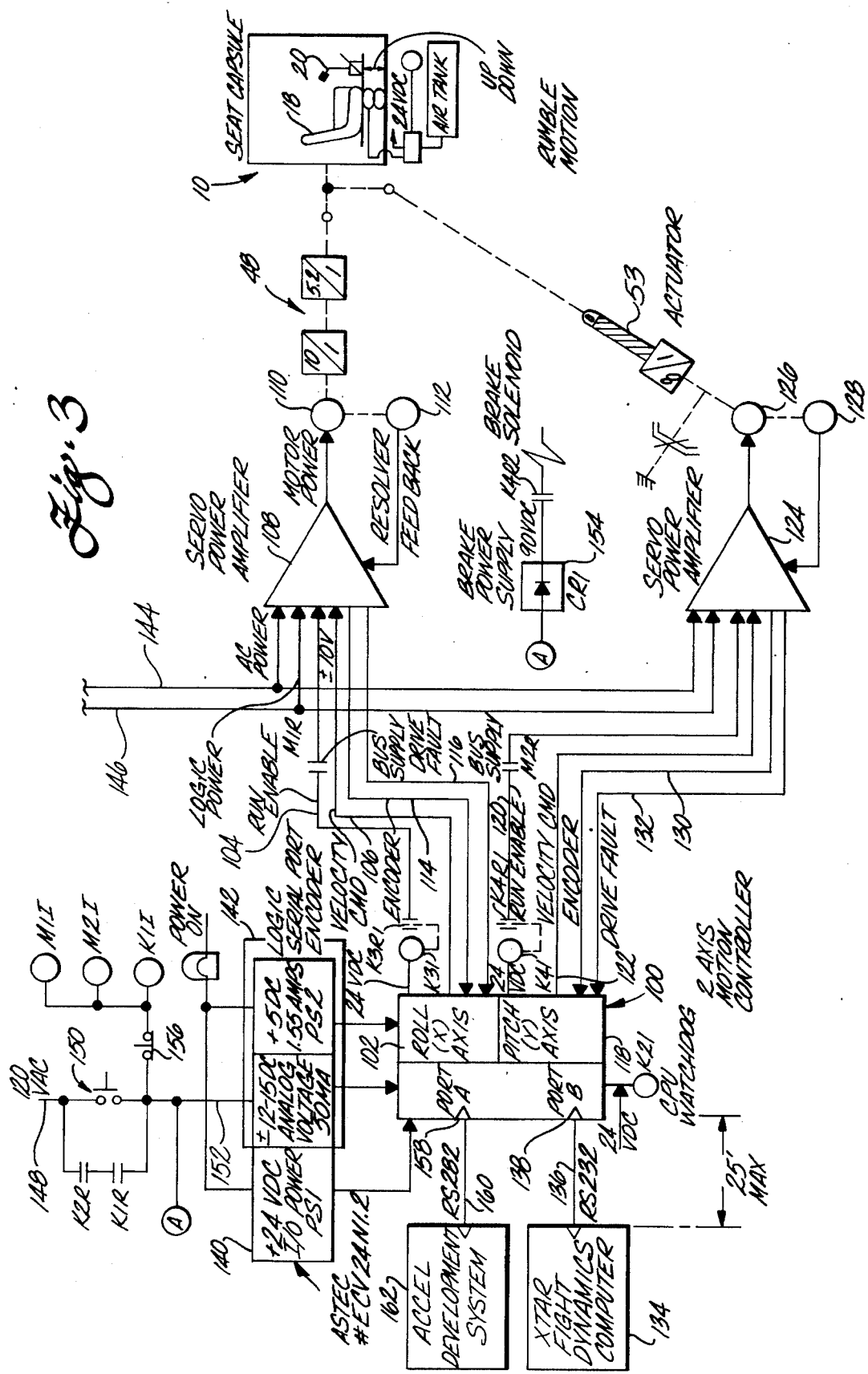
FIG. 3 is a block schematic of the control system for the embodiment of the flight simulator shown in FIGS. 1 and 2.

FIG. 3 shows the electrical system for operation of the flight simulator in block diagram form. A two axis motion controller 100 provides power control for the roll axis and pitch axis of the simulator. Position encoders provide feedback to the motion controller for closed loop operation. The roll axis channel 102 of the motion controller provides a run enable signal 104 and velocity command signals 106 to a first servo power amplifier 108. The first servo power amplifier provides power to a first motor 110 which drives the reducer 48 for roll axis motion of the simulator. The velocity command signal provided by the roll axis channel is plus minus 10 volts thereby providing magnitude and directional control for the servo power amplifier to drive the motor in a clockwise or counter-clockwise direction. A first encoder 112 provides position feedback from the first motor to the first servo power amplifier which provides an encoder signal 114 to the roll axis channel. In addition a drive fault signal 116 is provided by the first servo power amplifier to the roll axis channel in the event a drive fault is detected.

Similarly the pitch axis channel 118 provides a run enable signal 120 and velocity command signal 122 to a second servo power amplifier 124. The second servo power amplifier provides power to a second motor 126 operating the ball screw actuator for pitch motion of the simulator. A second encoder 128 provides feedback information on position to the second servo power amplifier which in turn provides an encoder signal 130 to the pitch axis channel of the controller. As in the roll channel a drive fault signal 132 is provided by the second servo power amplifier to the pitch axis channel upon detection of a drive fault.

In the embodiment shown in the drawings motion of the seat capsule simulates the flight of an aircraft. Inputs from the control stick 20 in the seat capsule are provided to a control computer 134 which calculates position and motion equations in time sequence based on the control inputs. Addition controls such as throttle may be employed for added realism in the simulation. The equations of motion derived by the computer are provided to the two axis motion controller through a first RS232 interface 136 to a first input port 138 of the two axis motion controller. Input from the computer to the motion controller is in the form of pitch and roll axis position information. The two channels of the motion controller compare position information commanded by the computer with current encoded position and provide velocity commands to the servo power amplifiers to resolve position differences.

In the present embodiment an XTAR Flight Dynamics Computer System is employed to simulate aircraft flight. The XTAR flight dynamics system incorporates equations of motion to create seat capsule position and motion to simulate aircraft flight. The visual display in the seat capsule is also controlled by the equations of motion provided by the XTAR Flight Dynamics Computer.

Power for the two axis motion controller is provided through a first power supply 140 which provides 24 volt DC input output power for the roll axis and pitch axis channels of the motion controller. A second power supply 142 provides plus and minus 15 volt analog power for operation of the controller and 5 volt DC power for logic serial port and encoder operation in the controller. System power for the servo power amplifiers is provided as 240 volt AC three phase power on line 144 and logic power on line 146. One hundred twenty volt AC power for the power supplies is provided on line 148. A relay interlock system is provided for safety in the system incorporated in the 120 volt AC power input. A spring actuated normally open switch 150 provides power on control through a first relay having input KII and contacts K1R. Contacts K1R provide power through line 152 to the system. Line 152 is also controlled by second relay contacts K2R controlled by input K2I from the two axis motion controller verifying operational input of the XTAR Flight Dynamics Computer. Interlocks on the run enable signals for the servo amplifiers are provided by relay inputs M1I and M2I and associated contacts M1R and M2R. These relays preclude run enable commands to the servo power amplifiers without proper power available to the motion controller. The run enable signals to the servo power amplifiers are provided through relays having inputs K3I and K4I with contacts K3R1 and K4R1 respectively. The pitch axis run enable signal 120 provided through relay K4 also incorporates second contacts K4R2 controlling a brake solenoid for the pitch axis of the simulator system. The brake for the system comprises the air actuator 58 previously described with regard to FIG. 1. Closure of contacts K4R2 allows brake power supply 154 to actuate the solenoid exhausting pressure from the air actuator releasing the seat capsule for pitch motion.

Deactivation of the system is accomplished by pressing the off switch 156 which in turn deactivates relays K1, M1 and M2 precluding run enable signals to the servo power amplifiers powering down the motion controller by opening contact K1R and removing power to the brake power supply thereby actuating the brake solenoid to pressurize the air actuator stabilizing the seat capsule in the pitch axis.

In the embodiment shown in the drawings the motion controller incorporates a second input port 158 for an RS232 interface 160. A second computer 162 may be employed through the second RS232 interface for direct control of the motion controller in developing equations of motion for use in driving the actuators of the simulator system. Operation of the simulator using the acceleration development system computer allows proper motor velocities and hence accelerations to be developed to properly simulate the desired motion.

The electromechanical elements for actuation of the system disclosed in the embodiments of the drawing are replaced in alternative embodiments with hydraulic actuators. Replacement of the Falk reducer unit and its electric motor with an appropriate hydraulic torque motor and replacement of the ball screw actuation system with appropriate hydraulic cylinders allows conversion of the system from electromechanical to electrohydraulic operation with commensurate improvement in operation.

Having now described the invention as required by the patent statutes, those skilled in the art will recognize modifications and substitutions to the embodiments as disclosed for particular applications or requirements. Such modifications and substitutions are within the scope and intent of the present invention as defined by the following claims.

What is claimed is:

1. A motion simulator comprising:

an occupant capsule incorporating seating for a patron and a control input operable by the patron;

a support frame;

a cantilevered articulating means interconnecting the support frame and the occupant capsule, the articulating means rotatable through at least 360° about a roll axis;

a first means for rotating the articulating means about the roll axis responsive to the control input by the occupant;

said articulating means further rotatable about a pitch axis and further comprising second means for rotating said articulating member in said pitch axis; and a controller intermediate the first and second rotating means and control input receiving the control input from the occupant capsule and applying defined rules of motion based on capsule position and control input and providing an output for control of the first and second rotating means proportional thereto.

2. A simulator as defined in claim 1 further comprising visual simulation means mounted to the occupant capsule and providing a display corresponding to the outputs of the controller.

3. A simulator as defined in claim 1 wherein the articulating member comprises a rotating head mounted to the seat capsule and carried by a casing supported by a pylon, said head engaging said casing through a first rotating member allowing rotation of the head about the roll axis and said casing pivotally mounted to the support pylon for rotation about the pitch axis, an axle extending through the support pylon and attached to the rotating head incorporating a universal joint proximate the pivot point of the casing and wherein the first means for rotating includes a first motor engaging the axle for rotating said axle and the second means for rotating includes a linear actuator interconnected to the casing through a lever extension and retraction of said linear actuator resulting in pivotal rotation of said casing.

4. A motion simulator comprising:

an occupant capsule incorporating seating for a patron and a control input operable by the patron;

a support frame;

a cantilevered articulating member comprising a rotating head mounted to the seat capsule and carried by a casing supported by a pylon, said head engaging said casing through a first rotating member allowing rotation of the head about the roll axis and said casing pivotably mounted to the support pylon for rotation about the pitch axis, an axle extending through the support pylon and attached to the rotating head incorporating a universal joint proximate the pivot point of the casing;

a first means for rotating the articulating means about the roll axis comprising a first motor engaging the axle for rotating said axle responsive to the control input by the occupant;

said articulating means further rotatable about a pitch axis and further comprising second means for rotating said articulating member in said pitch axis, including a linear actuator interconnected to the casing through a lever, extension and retraction of the linear actuator resulting in pivotal rotation of said casing, and;

a controller intermediate the first and second rotating means and control input receiving the control input from the occupant capsule and applying defined rules of motion- based on capsule position and control input and providing an output for control of the first and second rotating means proportional thereto.

5. A simulator as defined in claim 4 wherein the first motor comprises an electric motor and said linear actuator includes a ball screw driven by a second electric motor.

6. A simulator as defined in claim 5 wherein the first motor comprises a hydraulic torque motor and the linear actuator comprises a hydraulic cylinder.

7. A simulator as defined in claim 4 further comprising an air actuator connected through a second lever to the casing and a pressure reservoir interconnected to the air actuator for load balancing.

* * * * *

UNITED STATES PATENT AND TRADEMARK OFFICE
CERTIFICATE OF CORRECTION

PATENT NO. : 5,453,011
DATED : September 26, 1995
INVENTOR(S) : Eduard Feuer; Ronald L. Brown It is certified that error appears in the above-indentified patent and that said Letters Patent is hereby corrected as shown below:

Column 2, line 61, change "axis 14" to -- axis 44 --.

Column 4, line 41, change "KII" to -- K1I --.

Column 6, line 41, change "motion- based" to
    -- motion based --.

Signed and Sealed this

Fourteenth Day of May, 1996

Attest:

BRUCE LEHMAN

*Attesting Officer*    *Commissioner of Patents and Trademarks*